United States Patent [19]

Burke

[11] Patent Number: 4,944,387
[45] Date of Patent: Jul. 31, 1990

[54] BUCKET CONVEYOR SYSTEM

[76] Inventor: Desmond C. Burke, Mildura, 3500 Victoria, Australia

[21] Appl. No.: 292,528

[22] Filed: Dec. 30, 1988

[30] Foreign Application Priority Data

Jan. 5, 1988 [AU] Australia .............................. 0017/88

[51] Int. Cl.$^5$ ............................................. B65G 47/40
[52] U.S. Cl. .................................... 198/706; 198/710; 198/708; 56/330
[58] Field of Search ............... 198/706, 708, 710, 712; 56/330

[56] References Cited

U.S. PATENT DOCUMENTS

| 714,149 | 11/1902 | Clarke | 198/706 |
| 1,054,305 | 2/1913 | Mueller | 198/706 |
| 2,339,938 | 1/1944 | Meyer | 198/712 |
| 3,083,814 | 4/1963 | Meyer | 198/710 |
| 3,756,002 | 9/1973 | Mecca | 56/330 |
| 3,777,463 | 12/1973 | Claxton | 56/330 |
| 3,795,305 | 3/1974 | Sandvik | 198/708 |
| 3,988,878 | 11/1976 | Mecca | 56/330 |
| 4,770,287 | 9/1988 | Glowatzki | 198/708 X |

FOREIGN PATENT DOCUMENTS

| 0553669 | 3/1958 | Canada | 198/706 |
| 0022206 | 2/1983 | Japan | 198/706 |
| 6608265 | 8/1966 | Netherlands | 198/712 |
| 1265106 | 10/1986 | U.S.S.R. | 198/706 |

Primary Examiner—Robert J. Spar
Assistant Examiner—James R. Bidwell

[57] ABSTRACT

A bucket conveyor system 13 for a harvesting machine which can move along a row of plants. The bucket conveyor system has a pair of parallel endless roller chains 18 guided for movement along a generally rectangular path 17, and open-topped buckets 19 connected to the chains 18 at equally spaced intervals along the chains. The buckets each have a rear lip 36 extending over and beyond the front wall 32 of the next rearward bucket 19 to prevent gaps through which harvested fruit or juice can fall. The sole connection of the buckets 19 to the chains 18 is by a single shaft 44 projecting outward from the upper end of each side wall 31 of the buckets. As a bucket 19 is elevated, a fixed vertical bucket guide 27c engages a substantially vertical front wall 32 of the bucket to keep the bucket erect, with the engagement of the bucket guide 27c with the bucket wall 32 being at a substantial distance from the pivot connections 44 of the bucket to the chains to minimize stress in the bucket. As a bucket is tilted for discharge, a fixed curved bucket guide 27d engages the upper edge 37 of the bucket to cause its gradual inversion, with the engagement of the curved bucket guide 27d with the bucket edge 37 being at a substantial distance from the pivot connections 44 of the bucket to the chains to minimize stress in the bucket.

8 Claims, 6 Drawing Sheets

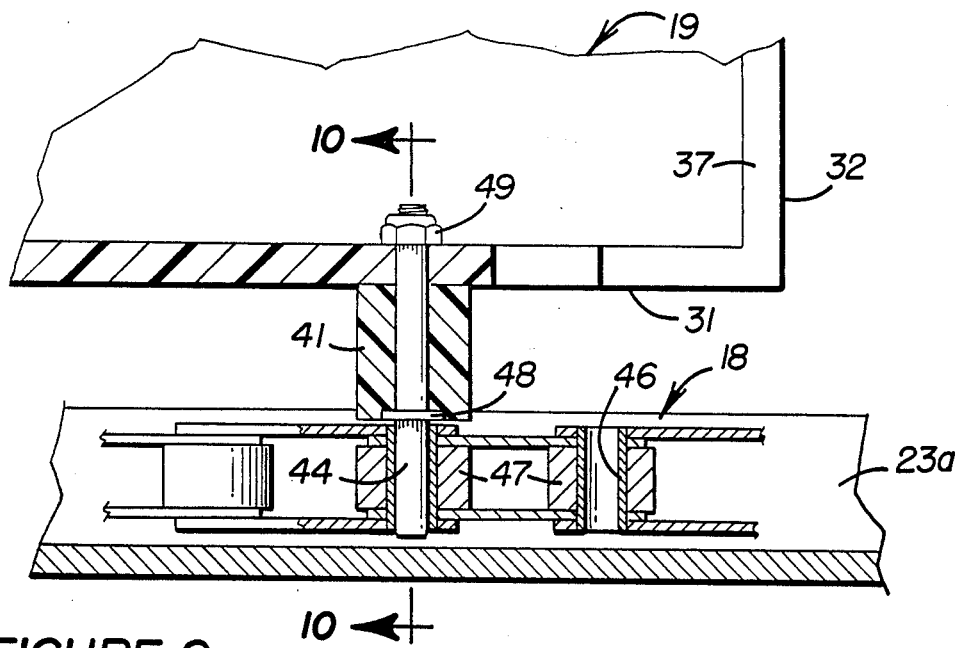
FIGURE 9
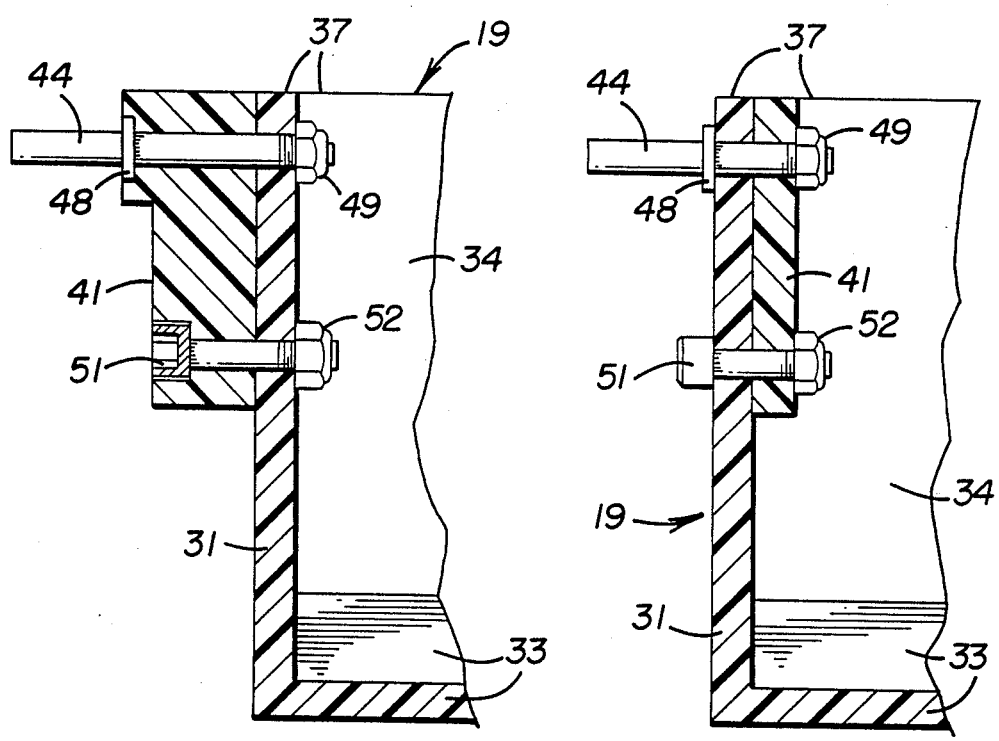
FIGURE 10
FIGURE 11

BUCKET CONVEYOR SYSTEM

BACKGROUND OF INVENTION

This invention relates to a chain driven bucket conveyor system for use with a mobile crop harvester, such as a grape harvester.

Wine grapes are mechanically harvested throughout the world by vigorously shaking the grapevine, breaking the individual berries loose from their capstems. When the capstems are pulled out of each berry, the berry starts to lose juice immediately. The more the fruit is tumbled in the conveyor system of the harvester, the more juice leaks out of each berry. After the fruit is removed during harvest, it is desirable to convey the fruit into the field trailers with as little tumbling and jostling as possible.

Generally speaking, there are two distinct types of conveyor systems used in the grape industry currently: (1) Continuous Belt Conveyor Systems and (2) Bucket Conveyor Systems.

The most universally used conveyor systems are the continuous belt type. These use a continuous belt approximately 18" wide, which is supported and driven by two 4" pulleys at each end of the belt. Each conveyor belt drops the fruit onto the next belt, conveying it out from under the vine, up to the top of the machine, out across the adjacent row into the trailer. A typical grape harvester will have eight belt conveyors to carry the fruit from each side of the vine into the trailer towed in the adjacent row.

The majority of the harvesters utilize a continuous belt conveyor because it is a simple, easily manufactured conveying system. It has, however, a number of disadvantages:

1. There are no effective ways to seal alongside the belt to avoid losing juice.
2. It is difficult to scrape the juice which collects on the surface of the belt to transfer it to the next belt in the system. When there is a cleat required, as on a sloped conveyor belt, it is impossible to scrape it at all.
3. Each transfer point between one conveyor belt and the next causes more juicing and mixing of the juice with the leaves in the conveyor belt. The more the leaves are coated with juice, the more difficult it is to remove them using the cleaning fans.

Many of these problems are alleviated by the bucket conveyor systems.

There are two types of bucket conveyor systems currently in use: (1) Those with buckets attached to a continuous belt, and (2) those with buckets attached to parallel drive chains.

The systems wherein the buckets are attached to a belt avoid most of the above disadvantages of the continuous belt conveyor system. However, they have disadvantages of their own:

1. Since the buckets act as belt cleats in the pick up section of the belt, the fruit has to be transferred off the belt into the buckets when the system moves into the vertical section of the conveyor. This transfer of the fruit cases the fruit to juice and mixes the juice with the leaves. These juice-coated leaves then become very difficult to remove during the cleaning phase.

The systems wherein the buckets are mounted on two parallel drive chains solves both the above problems associated with the continuous belt conveyor systems and those associated with the bucket-on-a-belt systems. An example of a chain-driven bucket conveyor system is that enclosed in U.S. Pat. No. 3,988,878, issued on Nov. 2, 1976. These systems have many advantages, the most important of which is that the fruit drops directly into the buckets as it is removed from the grapevine. During the entire conveying cycle (pick up, elevating and dumping) the fruit is protected inside the buckets without being tumbled or jostled.

However, all chain-driven bucket conveyor systems currently in use, including that disclosed in the aforementioned patent, have several disadvantages.

1. The chains stretch from use, leaving gaps between the buckets for fruit or juice to fall through onto the ground.
2. The systems on the ends of the buckets used to hold the buckets erect and to tip them for dumping are quite fragile and complex. This results in may many malfunctions during operation.
3. The attachment means for connecting the buckets to the chains, such as the U-shaped clips in the abovementioned patent, are easily snagged by the vines or the limbs of the plants being harvested. Such snagging can impose sufficiently high stresses on the buckets as to cause them to break during operation. In such case, the operator must either stop harvesting operations while the bucket is replaced, or continue harvesting with fruit dumping onto the ground through the gap at the broken bucket.

SUMMARY OF INVENTION

It is the primary object of the present invention to provide a chain-driven bucket conveyor system which eliminates the gaps between buckets of present chain-bucket conveyor systems through which fruit or juice are lost.

It is a further object of the present invention to provide a chain-driven bucket conveyor system with a simple, strong, non-snagging attachment to the chain and with simple, inexpensive and reliable bucket guides to maintain the brackets erect and dump them with minimal stresses imposed on the buckets.

Additional objects, advantages and novel features of the invention will be set forth in the description which follows, and in part will become apparent to those skilled in the art upon examination of the following, or may be learned by practice of invention. The objects and advantages of the invention may be realized and attained by means of the instrumentalities and combinations pointed out in the appended claims.

To achieve the foregoing and other objects, and in accordance with the present invention, as described and broadly claimed herein, an improved chain-driven bucket conveyor system is provided having a pair of parallel endless chains each having spaced apart roller bearings, a chain guide confining and guiding the chains for movement along a generally rectangular path, a plurality of open-topped buckets connected to the chain at equally spaced intervals, the buckets each having a rear lip extending over and beyond the front wall of the next rearward bucket when the buckets are moved along the lower horizontal path of the generally rectangular path, so as to prevent any gaps between the buckets.

A further aspect of the invention is that the buckets are connected to the chains by only a single shaft at each end of the buckets, the shafts projecting from the buckets completely into the roller bearings of the chains.

Yet another aspect of the invention is that the conveyor system has fixed bucket guides to hold the buckets erect as they are elevated and then to tip the buckets to discharge the contents onto a discharge belt conveyor, the bucket guides engaging the buckets at a substantial distance from the connection of the buckets to the chains so as to minimize the stresses imposed on the buckets.

BRIEF DESCRIPTION OF THE DRAWINGS

In the drawings, wherein like parts are designated by like reference numbers throughout the same.

FIG. 9 is an enlarged sectional detail of a bucket and chain, taken on line 9—9 of FIG. 5.

FIG. 10 is a sectional view taken on line 10—10 of FIG. 9.

FIG. 11 is a view similar to that of FIG. 10, illustrating a modification of a bucket usable in the bucket conveyor system of the present invention.

DESCRIPTION OF THE PREFERRED EMBODIMENT

Figure 1:
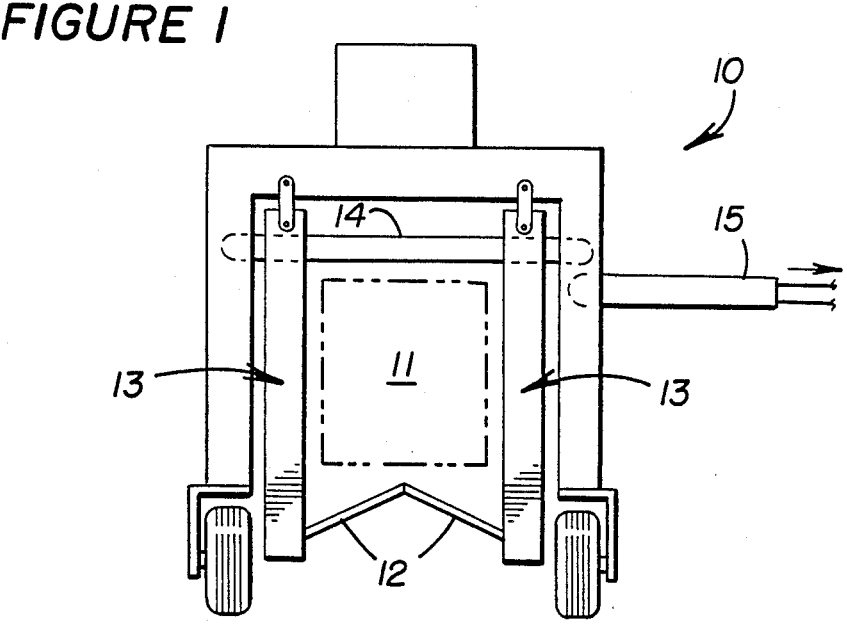
Fig. 1 is a simplified end view of a row harvester having a bucket conveyor system constructed in accordance with the present invention.

Referring now to the drawings wherein is illustrated a preferred embodiment of the present invention, FIG. 1 shows an end view of a wheeled harvester 10, self-propelled or tractor-drawn, adapted to straddle and move along a row of plants to be harvested. For purposes of convenience, the description which follows refers specifically to a grape harvester. However, the present invention is not limited to such use, and may be used with other row crops. The harvester carries a suitable picking head 11 which will remove the crop, such as grapes, for example, from the plants. The removed grapes will fall onto enclosed closure plates 12 and be directed outwardly and downwardly to the two bucket conveyor systems 13 which are suspended from the main frame of harvester 10. These two parallel conveyor systems 13 will convey the harvested grapes upwardly and dump them onto a cross conveyor 14, which in turn dumps the grapes onto the discharge conveyor 15 to carry the grapes to a collection trailer (not shown) moving parallel to and with the harvester 10.

Figure 2:
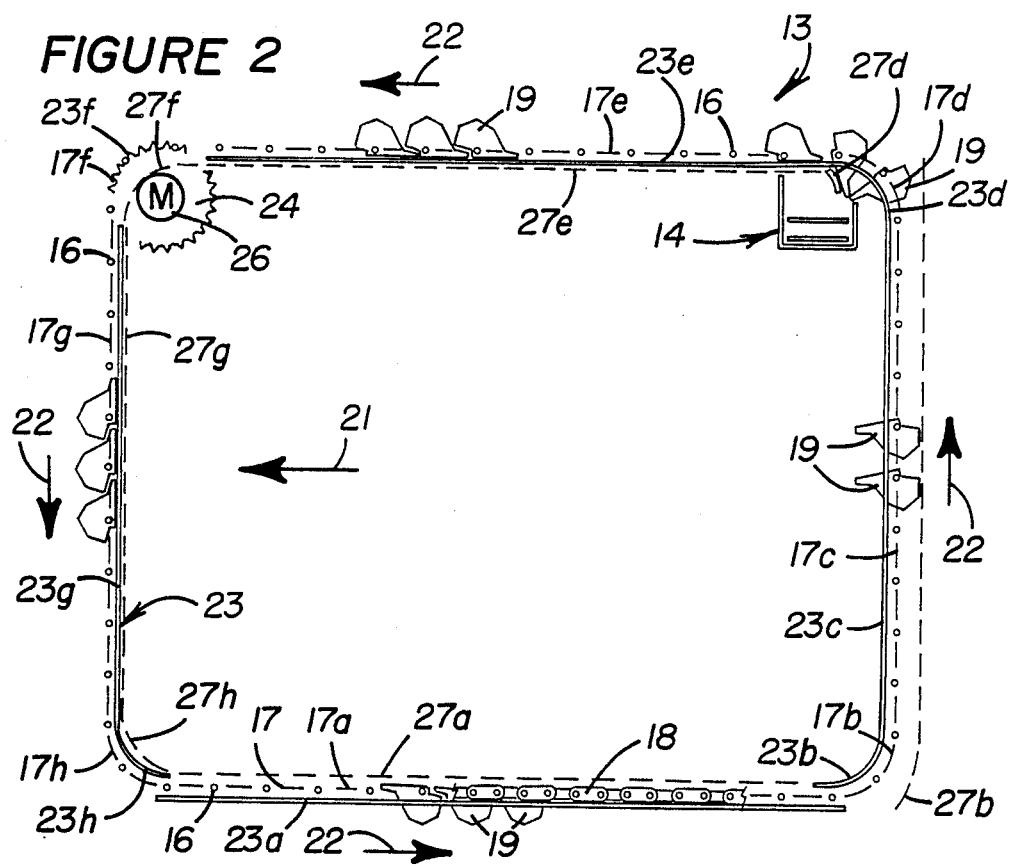
FIG. 2 is a diagrammatic view of the bucket conveyor system of the present invention.

FIG. 2 is diagrammatic side view of one of the two identical bucket conveyor systems 13 of FIG. 1. The small circles 16 in FIG. 2 represent the generally rectangular path of movement 17 of endless roller chains 18 and buckets 19. The bucket conveyor system 13 includes two parallel endless chains 18 to which the sides of buckets 19 are connected for movement with the chains. The overall path of movement 17 includes a lower horizontal path 17a, an upward vertical path 17c, an upper horizontal path 17e, a downward vertical path 17g, and four curved paths 17b, 17d, 17f and 17h at the four corners between the horizontal and vertical paths, all as shown in FIG. 2. The direction arrow 21 indicates the direction of forward movement of the harvester 10 while the direction arrows 22 indicate the direction of movement of the chains 18 and buckets 19 in the conveyor system 13.

The solid lines in FIG. 2 represent the chain guide 23 which confines and guides the chains 18 for movement along the rectangular path of movement 17. For convenience, the chain guide 23 has guide members 23a–h corresponding to the paths of movement 17a–h described above. The chain guide members 23f at the upper left corner of the system are comprised by two parallel toothed sprockets 24, one for each of the two endless chains 18. The sprockets 24 are mounted on a common shaft and driven by motor 26 to move the chains 18 and buckets 19 through their indicated paths of movement.

The dashed lines in FIG. 2 represent fixed bucket guide members along the path of movement of the buckets to engage the buckets 19 and hold or move them in or to desired positions as the buckets move throughout their path of movement. Again, reference numerals 27a–h represent the bucket guide members corresponding to the portions 17a–h of the path of movement 27 of the chains and buckets.

Figure 3:
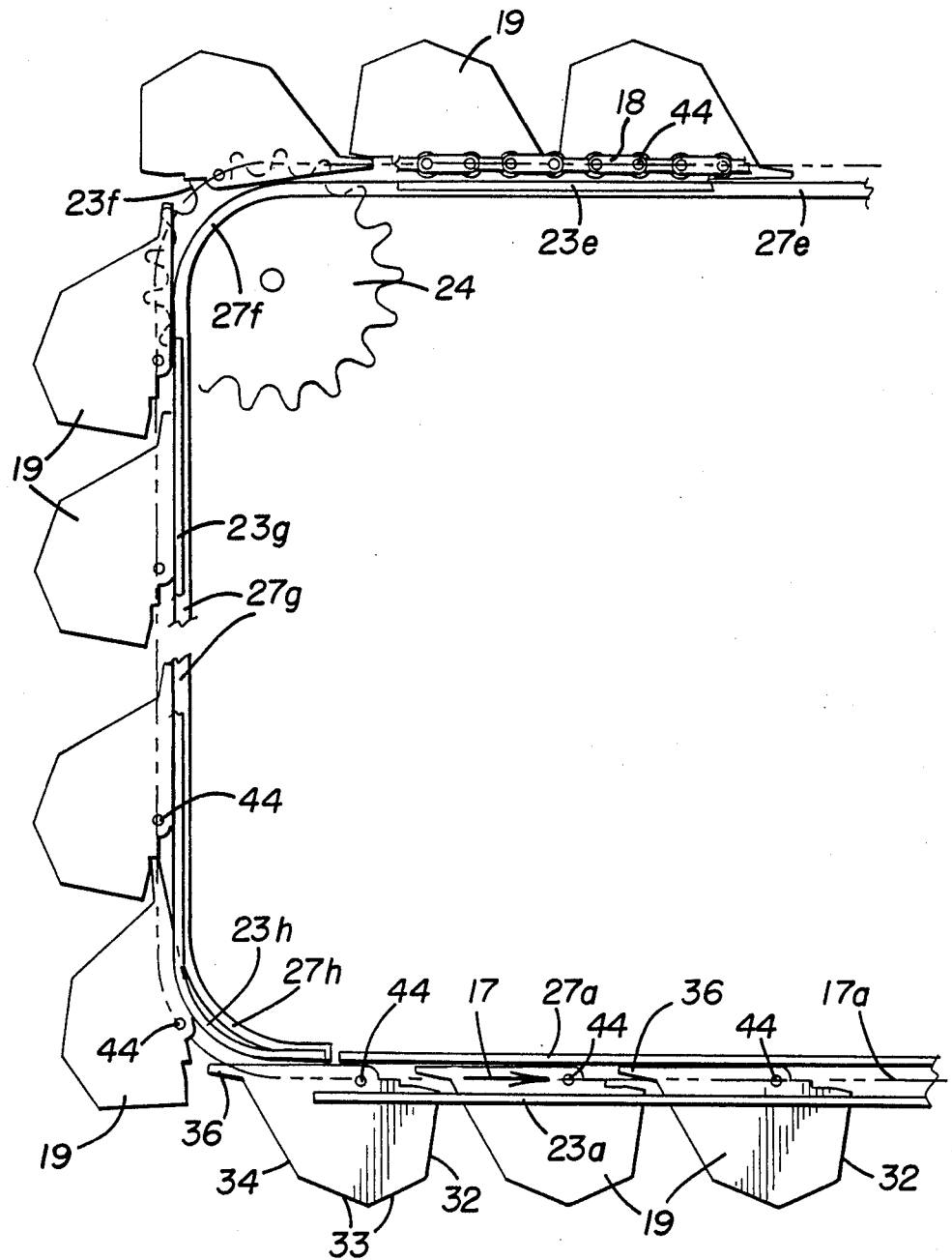
FIG. 3 is a simplified and fragmentary view of the upper and lower left portions of FIG. 2.
Figure 4:
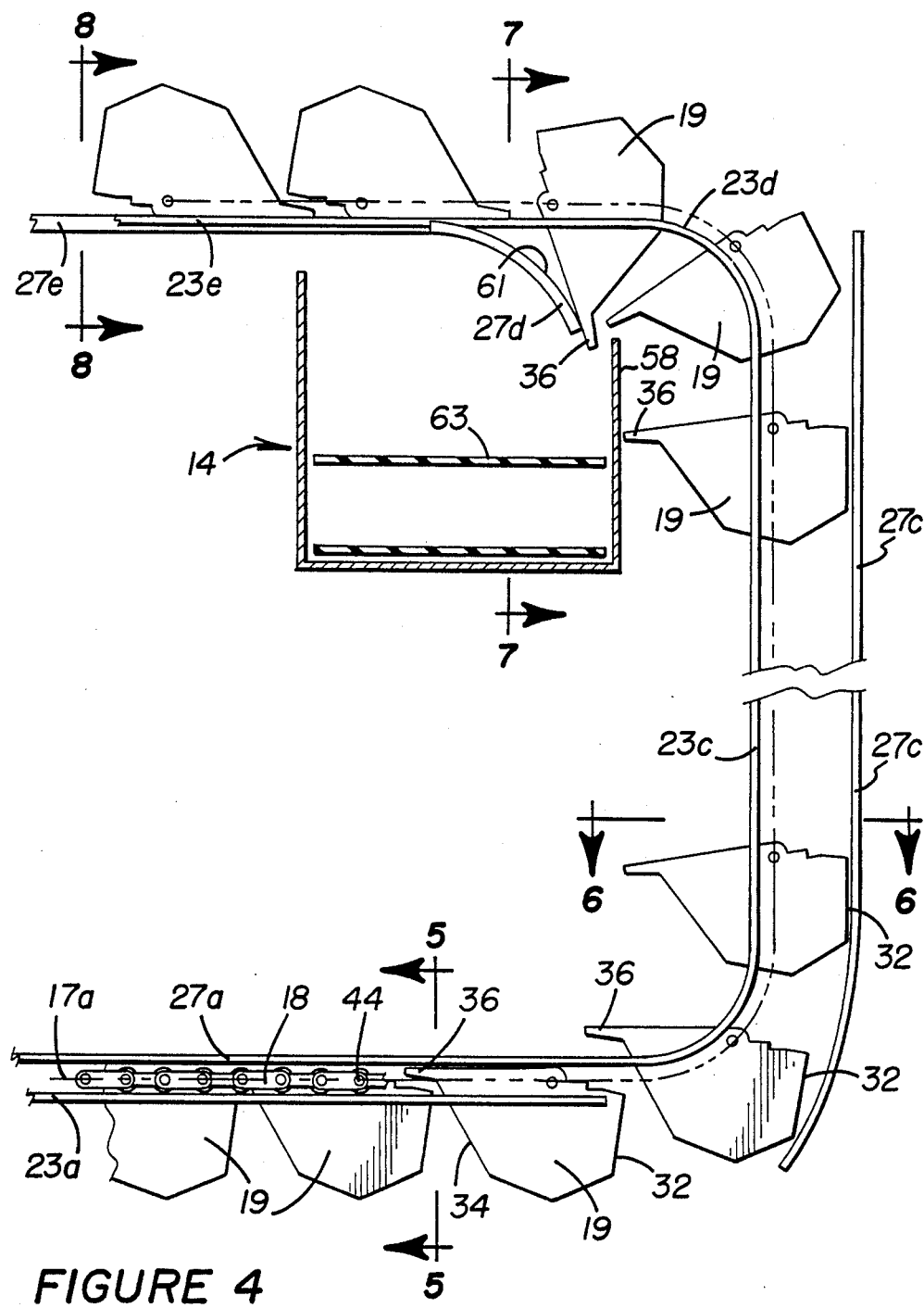
FIG. 4 is a simplified and fragmentary view of the upper and lower right portions of FIG. 2.

FIGS. 3 and 4 show in more detail the positions of the buckets 19 as they are moved through the conveyor system by chains 18, while FIGS. 5–10 show the constructional details of the chains 18, the buckets 19, the chain guide members 23a–h and the bucket guide members 27a–h.

The open topped buckets 18 are all identical, and each has two parallel and spaced apart side walls 31, a front wall 32, inclined bottom walls 33, a rear wall 34, and a rear lip 36 extending between the side walls 32 and rearwardly of the rear wall 34. The terms "front" and "rear" as used in the description of the buckets 19, relate to the direction of movement of the buckets relative to the conveyor system 13. For convenience, the terms "vertical," "upper," and so forth, as used in the description of the buckets, describe the buckets when in the erect crop-carrying positions as they are moved along the lower horizontal path 23a. As seen in FIG. 3 and 4, the rear lips 36 of each bucket 19 extends over and beyond the front wall 31 of the next bucket 19 rearward thereof. The upper surfaces of the side walls 32, the front wall 32, and the rear lip 36 constitute an upper edge 37 around the open upper end of each bucket 19. The buckets 19 are preferably made of plastic, such as polypropylene.

Each bucket 19 has an external lug 41 on each side wall 32 to form a strong support for pivot shaft 44 which extends outwardly from the upper end of the lugs 41, the pivot shafts 44 each having a diameter and length to be received in one of the bushings 46 of the roller bearings 47 of chains 18. The pivot shafts 44 provide the sole connection of the buckets 19 to the chains 18.

The lugs 41 are preferably formed as separate replaceable parts for securement to the buckets 19 as shown in FIGS. 9 and 10. Each pivot shaft 44 has a radially enlarged flange 48 bearing against the lug 41 to hold the lug in place when nut 49 is tightened onto the threaded end of shaft 44. Similarly, bolt 51 and nut 52 secure the lower end of lug 41 to the bucket.

Figure 5:
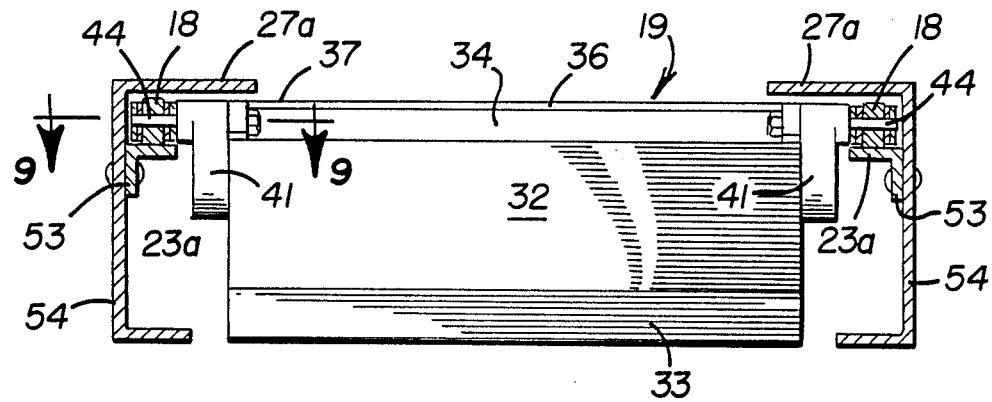
FIGS. 5, 6, 7 and 8 are sectional views of the bucket conveyor system of the present invention, taken on lines 5—5, 6—6, 7—7 and 8—8 respectively of FIG. 4.
Figure 6:
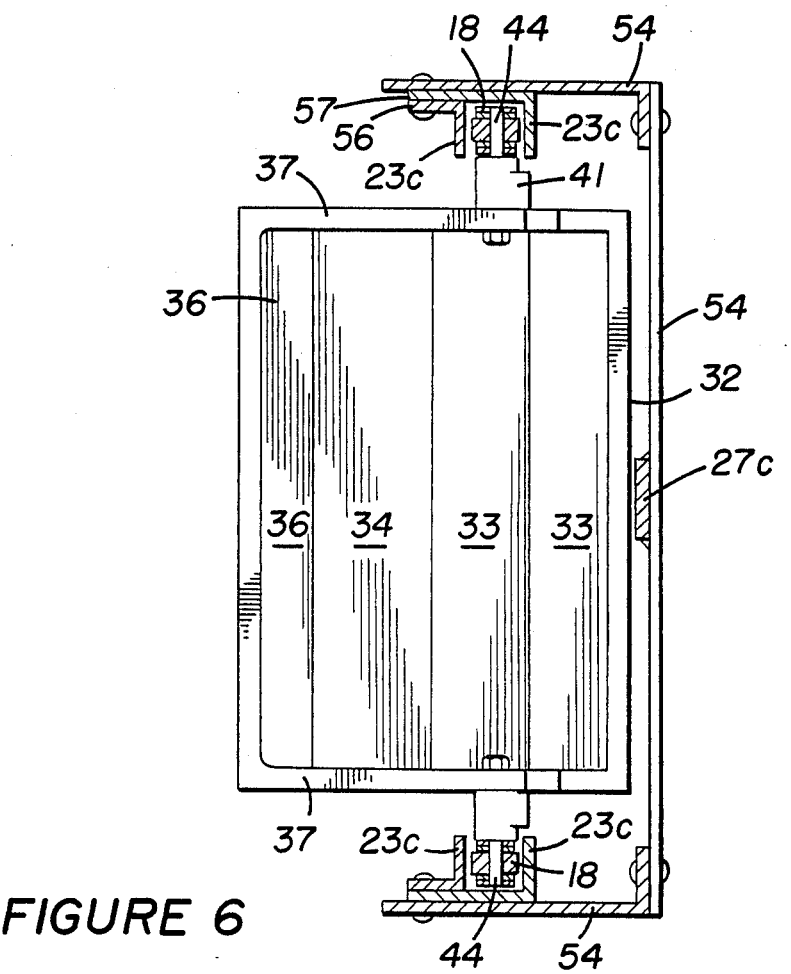
Figure 7:
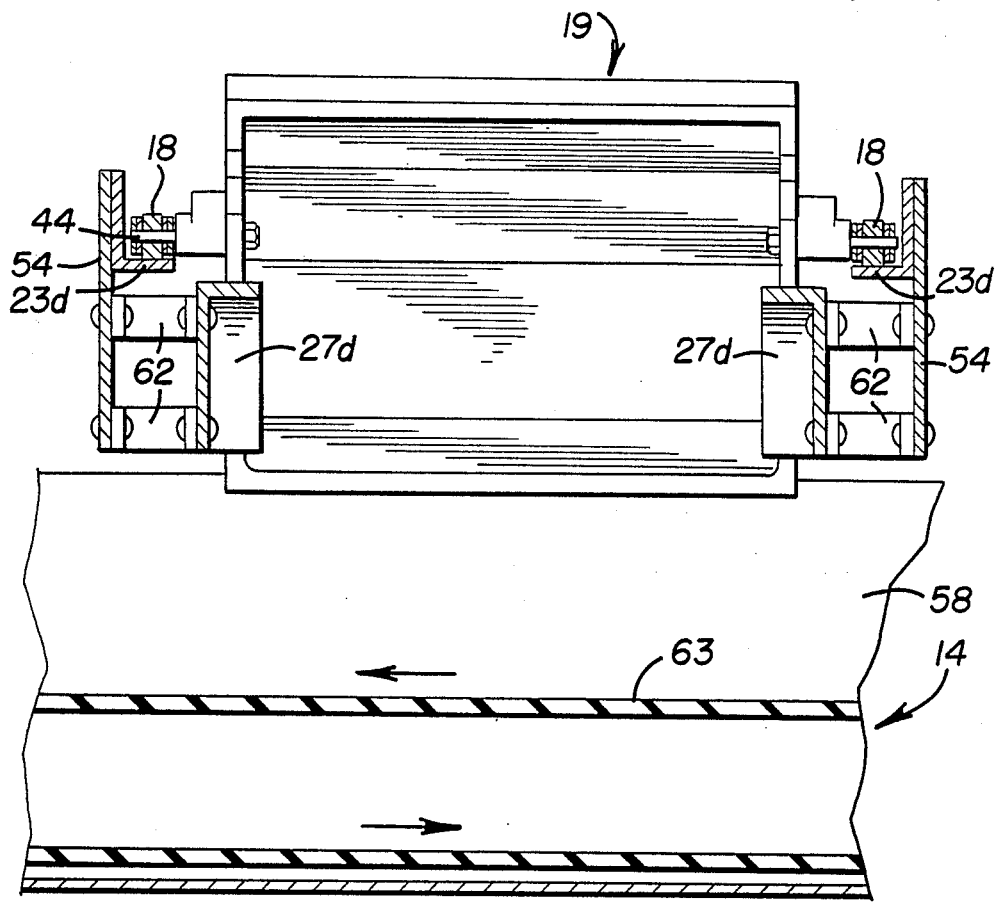

The operation of the bucket conveyor system 13 can best be described with reference to FIGS. 3 and 4. As the chains 18 move along the lower path of movement 17a, the chains 18 are supported by the horizontal flanges 23a of the angle irons 53 secured to the frame 54 of the bucket conveyor system 13. As shown in FIG. 5, the flanges 23a are narrow enough so that they do not engage the lugs 41 of buckets 19. The conveyor frame 54 has at least one inwardly extending flange 27a which functions as a fixed bucket guide for engaging the upper edge 37 of the buckets 17 at the side walls thereof during movement of the chains 18 along the lower path 17c to maintain the buckets in erect position to receive the harvested grapes and to prevent the bucket from tipping. The rear lip 36 of each bucket overlies the next rearward bucket so that there are no gaps between the buckets through which the harvested grapes or their juice can be lost.

As a bucket comes to the end of the lower horizontal path 17a and the chains move up through the curved path 17b, the chains 18 will engage and be guided by the curved chain guides 23b and the bucket will start to be lifted upwardly by the chains. As it does so, the bucket is free to swing about the connections of pivot shafts 44 to the chains 18. Because of the weight of the rear lip 36, the bucket will pivot in a counterclockwise direction (as viewed in FIG. 4), but the engagement of the rear lip of the bucket with the next rearward bucket will limit the amount of tilting so that the contents of the bucket are not spilled. On further upward movement of the bucket, its rear lip will be lifted up off the next rearward bucket. However, this upward and rearward movement of the bucket will bring it into engagement with the lower curved bucket guide member 27b mounted on conveyor frame 54 to engage the front wall 32 of the bucket centrally thereof.

As the bucket and chains continue upwardly, the chains 18 come to the fixed angle irons 56 and 57 (Fig. 6), each of which have vertical flanges with chain guide portions 23c located on opposite sides of the chains. The vertical bucket guide member 27c, which is an extension of curved guide member 27b and is also fixed to conveyor frame 54, engages the front walls 32 of the buckets centrally thereof to maintain the buckets substantially erect as they are moved up through the vertical path 17c. For purposes of definition, the front walls 32 of the buckets may be considered as being substantially vertical as long as they are sufficiently vertical so that their engagement with the vertical guide 27c will prevent the buckets from tilting enough to cause them to spill out their contents as the buckets are elevated.

As a bucket comes to the upper curved path 17d, it will have been elevated so that its rear lip 36 clears the wall 58 of the cross conveyor 14. As the bucket begins to move through the curved path 17d, it will leave the influence of the vertical bucket guide member 27c. The bucket is now free to swing and its balance will cause it to tilt in a counterclockwise direction with its rear lip over the cross conveyor. Continued movement of the bucket by the chains 18 will bring the edge 37 of the bucket, adjacent its rear lip 36, into engagement with the lower ends of the curved bucket surfaces 61 which extend upwardly and forwardly on the fixed bucket guide members 27d. The members 27d are secured in fixed relation to frame 54, as by brackets 62, below the upper chain guide 23e and forward of the curved chain guide 23d. Continued movement of the bucket will cause its edge 37 to ride along the upwardly inclined bucket guide surfaces 61 to dump the bucket onto the upper flight 63 of the cross conveyor 14 and to gradually cause the bucket to invert. Since the points of initial engagement of the bucket guide surfaces 61 with the bucket 19 near its rear lip 36 are located a substantial distance from the pivotal connection of the bucket to the chains, the stresses imposed on the bucket during its inversion will be at a minimum. The bucket guide member 27d will continue to engage the edge surface 37 of the bucket near the sides of the bucket until the bucket has been moved past the discharge conveyor 15.

Figure 8:
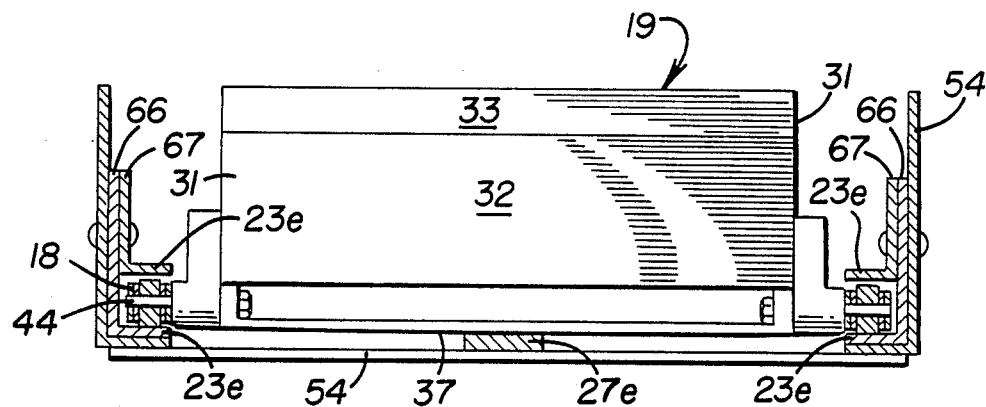

After inversion and dumping, the buckets will then be moved horizontally and forwardly. As seen in FIG. 8, the chains 18 are supported between flanges 23e of the angle irons 66 and 67 fixed to frame 54. An elongated horizontal bucket guide member 27e is secured to frame 54 to engage the now-inverted upper edge 37 of the bucket, centrally thereof, to maintain the buckets in inverted position as they travel the length of the upper path 17e.

At the forward end of the upper path, the drive sprockets 24 constitute the guides 23f for the chains 18. The curved bucket guide member 27f is a continuation of the horizontal bucket guide member 27e and again engages the upper edge 37 of the buckets centrally thereof. However, because of the overlapping of the rear lip 36 of a bucket with the next rearward bucket, the curved bucket guide member 27f must extend inwardly of the curved path defined by the sprockets 24 in order to allow movement of the buckets around the curved path 17e without interference with each other.

As the buckets move downwardly, the chains 18 will be guided by vertical chain guide members 23g, and the buckets will be maintained in a position as shown in Fig. 3 by the fixed vertical bucket guide member 27g which is arranged to engage the upper edge 37 of the buckets in the same manner as illustrated in FIG. 8.

After the buckets have moved downwardly, the chains 18 will be guided around the curved chain guides 23h, and the buckets will be held in position by a curved bucket guide member 27h which is fixed to frame 54 and is an extension of the vertical bucket guide member 27g. As above, the bucket guide member 27h is located inwardly of the chain guide members 23h so that the buckets can move through this portion of the conveyor system without the rear lips of the buckets interfering with such movement.

At this point, the buckets will again be moved in overlapped position along the lower horizontal path to collect the harvested crop.

As may be seen from the foregoing description, the present bucket conveyor system overcomes the problem of crop or juice loss by gaps between buckets during movement along the lower horizontal path. The amount of overlap of the rear lip with the next rearward bucket is sufficiently great so that even if there is some stretching of the chains in use, the amount of stretching will be much less than the amount of overlap.

The bucket lugs 41 are smooth and the sole attachment of the buckets to the chains is by way of the shafts 44 which are completely within the chains. Thus, there are no projections from the buckets which can be caught by the plants being harvested. As a consequence, the stresses on the buckets will be minimized so that there will be minimum failures of the buckets during operation.

FIG. 11 illustrates a modification of the buckets 19 which may be used in the present bucket conveyor system. In this embodiment, the strengthening lugs 41 are positioned internally of the side walls 31 of the bucket. With this arrangement, the side walls 31 of the bucket can be closely adjoined to the chains 18, rather than being spaced therefrom by the thickness of the lugs 41. Thus, for a given spacing between chains 18, buckets as illustrated in FIG. 11 can have a greater carrying capacity than those with external lugs 41. Since the chain guide members 23b, c, d, e, f and h are particularly designed to not engage the external lugs 41 of the buckets 19, bucket as shown in FIG. 11 may be freely substituted into the conveyor systems 13 described above.

The foregoing description of the preferred embodiment has been presented for purposes of illustration and description. It is not intended to be exhaustive or to limit the invention to the precise form described, and obviously many other modifications are possible in light of the above teaching. The embodiment was chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

I claim:

1. A bucket conveyor system for a harvesting machine which can move along a row of plants, said bucket conveyor system comprising:
    a pair of parallel endless chains each having spaced apart roller bearings,
    means forming generally rectangular chain guides for said endless chains to confine and guide said chains for movement rearwardly along a lower horizontal path, upwardly along an upward vertical path, forwardly along an upper horizontal path, downwardly along a downward vertical path, and along four curved paths at the four corners between the horizontal and vertical paths,
    a plurality of open-topped buckets connected to said endless chains at equally spaced intervals therealong, said buckets each having two side walls, a front wall, a rear wall, a rear lip extending between said side walls and rearwardly of said rear wall, and an upper edge around side walls, front wall and rear lip, the rear lip of each bucket extending over and beyond the front wall of the next bucket rearward thereof during movement of said chains along said lower path, said buckets each having a single pivot shaft extending outwardly from the upper end of each of said side walls, said shafts extending into roller bearings of said endless chains and being the sole connection of said buckets to said endless chains,
    a first fixed bucket guide member engageable with the upper edge of said buckets for maintaining said buckets erect during movement of said buckets along said lower horizontal path,
    a second fixed bucket guide member engageable with said buckets for maintaining said bucket substantially erect during movement of said bucket along said upward path,
    a third fixed bucket guide member engageable with said buckets for inverting said buckets over a discharge conveyor having a generally vertical wall spaced forwardly of said second fixed bucket guide member during movement of said buckets along said curved path between said upward path and said upper horizontal path and along said upper horizontal path, said third fixed guide member being positioned to first engage said buckets after their lips have moved forwardly of said discharge conveyor wall.

2. A bucket conveyor system as set forth in claim 1, wherein said front walls of said buckets are substantially vertical and wherein said second bucket guide member is vertical and positioned to engage said front walls of said buckets as said buckets move along said upward path.

3. A bucket conveyor system as set forth in claim 1, wherein said third bucket guide member includes an upwardly and forwardly inclined guide surface positioned to engage said upper edge of said buckets near said rear lip thereof during movement of said buckets along said curved path between said upward path and said upper horizontal path and then along said upper horizontal path.

4. A bucket conveyor system as set forth in claim 3, wherein said front walls of said buckets are substantially vertical and wherein said second bucket guide member is vertical and positioned to engage said front walls of said buckets as said buckets move along said upward path.

5. A bucket conveyor as set forth in claim 1, and further including:
    fourth, fifth, sixth and seventh bucket guide members for engaging said buckets during movement of said buckets along said upper horizontal path, along said curved path from said upper horizontal path to said downward path, along said downward path, and along said curved path from said downward path to said lower horizontal path, respectively, said fourth, fifth, sixth and seventh bucket guide members each engaging said upper edge of said buckets centrally of said buckets,
    said fifth and seventh bucket guide members being curved and located inwardly of the curved paths of the chains adjacent thereto.

6. A bucket conveyor system as set forth in claim 5, wherein said front walls of said buckets are substantially vertical and wherein said second bucket guide member is vertical and positioned to engage said front walls of said buckets as said buckets move along said upward path.

7. A bucket conveyor system as set forth in claim 5, wherein said third bucket guide member includes an upwardly and forwardly inclined guide surface positioned to engage said upper edge of said buckets near said rear lip thereof during movement of said buckets along said curved path between said upward path and said upper horizontal path and then along said upper horizontal path.

8. A bucket conveyor system as set forth in claim 7, wherein said front walls of said buckets are substantially vertical and wherein said second bucket guide member is vertical and positioned to engage said front walls of said buckets as said buckets move along said upward path.

* * * * *